L. J. VAN GUELPEN.
PASTING MACHINE.
APPLICATION FILED MAR. 17, 1919. RENEWED FEB. 15, 1922.

1,423,282.

Patented July 18, 1922.
2 SHEETS—SHEET 1.

INVENTOR.
Louis J. Van Guelpen
By John W. Strehei
ATTORNEY.

UNITED STATES PATENT OFFICE.

LOUIS J. VAN GUELPEN, OF CINCINNATI, OHIO.

PASTING MACHINE.

1,423,282.   Specification of Letters Patent.   Patented July 18, 1922.

Application filed March 17, 1919, Serial No. 283,223. Renewed February 15, 1922. Serial No. 536,818.

*To all whom it may concern:*

Be it known that I, LOUIS J. VAN GUELPEN, a citizen of the United States, residing at the city of Cincinnati, in the county of Hamilton and State of Ohio, have invented certain new and useful Improvements in Pasting Machines, of which the following is a specification.

The object of my invention is to provide a cheap, simple and highly efficient machine to be used for pasting surfaces of material together, said surfaces generally being of different materials, as for example, canvas and leather, a lining of some kind and leather, as for example, a vamp and its lining, or for example, a certain material and its re-inforcement. The paste may be placed on one of the pieces or on both. When the paste has been distributed onto the material, the operator presses them together in any manner.

In the manufacture of shoe parts, which must be lined and reinforced, it has been difficult to evenly distribute the paste over the surface of the material and all parts of the face of the material are not reached by the paste and the paste often gets onto the edge of the leather and does not make a smooth, uniform and symmetrical job.

I overcome these defects and objections and distribute the paste evenly, uniformly and all over the surface of the material at equi-distant points so when the two pieces of material are pressed together, the surface will be even and smooth and not buckle or wrinkle or show uneven in certain spots. My machine does the work quickly and is sanitary and can be adjusted and taken apart or set up quickly.

Its various features and advantages will readily become apparent from a perusal of the following specification and claims.

Figure 2:
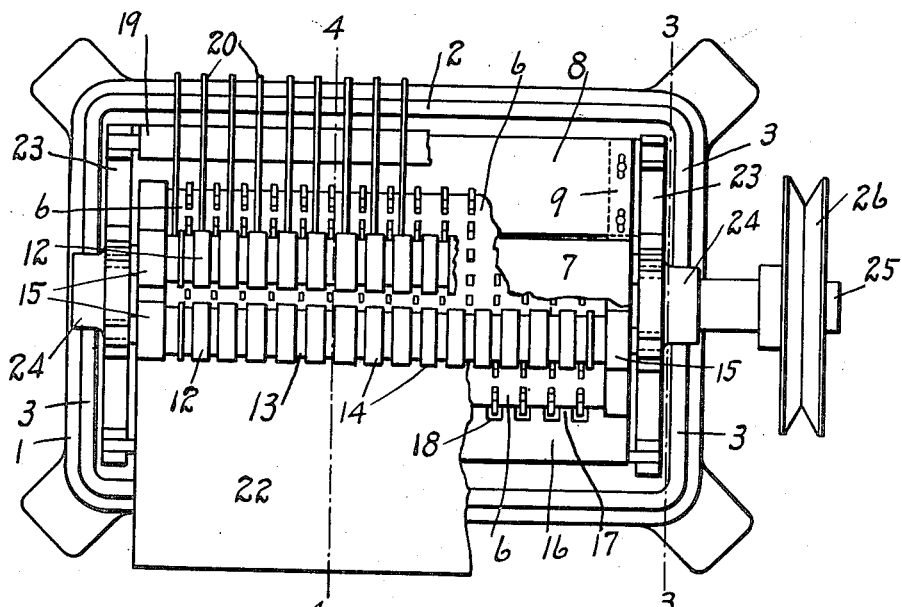
Figure 1:
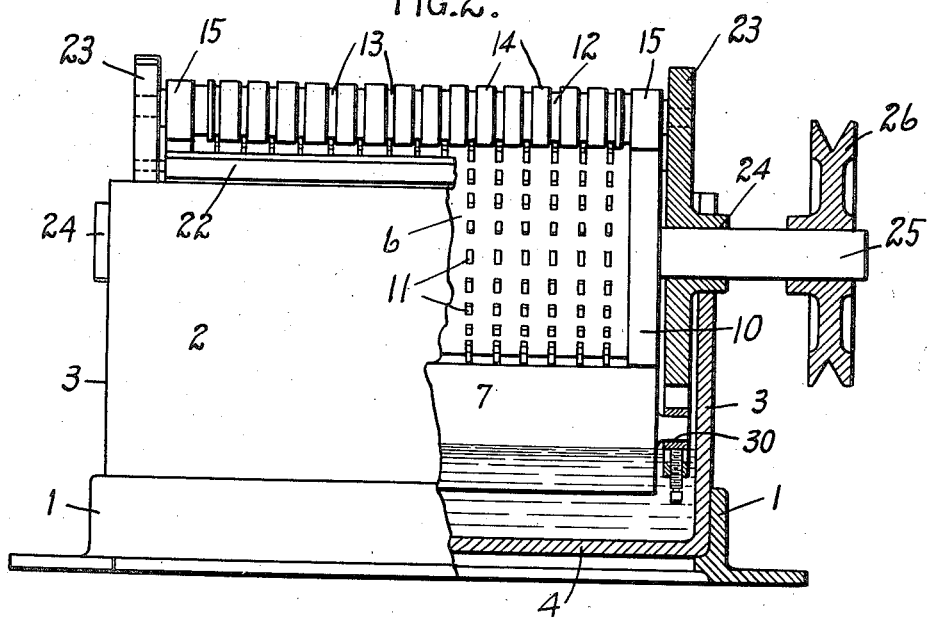
Figure 3:
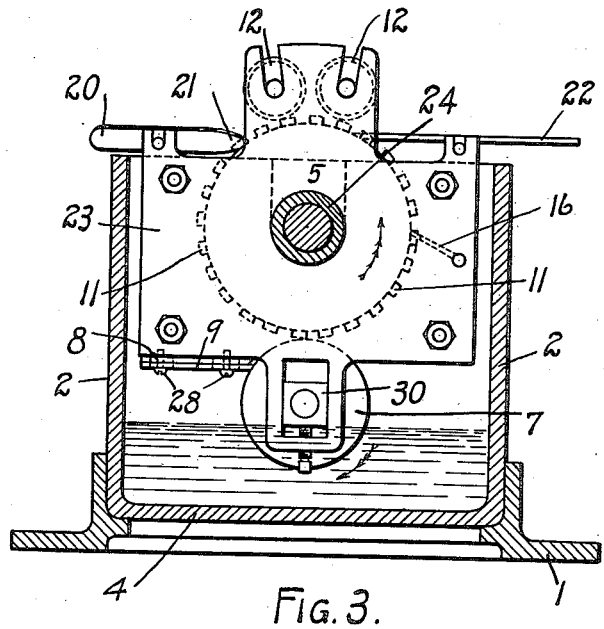
Figure 4:
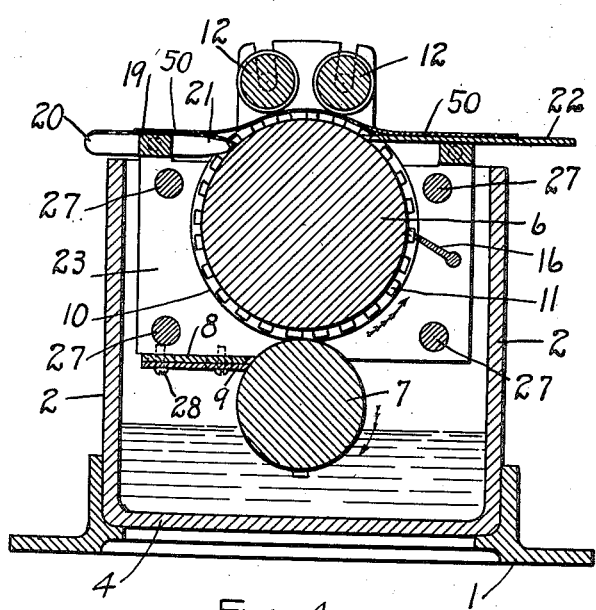

In the accompanying drawings, forming part of this specification:

Fig. 1 is a side view in elevation of one side of the machine, partly broken away to show construction and certain parts being in section, Fig. 2, is a plan view of the machine, parts being broken away, Fig. 3, is a section on the line 3—3 of Fig. 2, and Fig. 4, is a sectional view, taken on the line 4—4 of Fig. 2.

In carrying out my invention, I provide a base frame 1 and into this base frame I set a paste pot formed of sides 2, 2, ends 3, 3, and a bottom 4. This paste pot can be removed from the base frame for cleaning purposes.

In the ends 3—3 of the paste pot I form bearing slots or recesses 5.

The roller 7 is the roller which gathers paste from the paste pot and delivers the paste to the pasting roller 6. The pasting roller 6 is provided with a series of protuberances, teeth or lugs 11, arranged in rows along the face of the roller and in alignment around the periphery of said roller, so that the paste will be evenly distributed over the material. In connection with the paste feeding roll 7, I provide a stripper 8, which strips any surplus paste off of the roll 7. At each end of the said stripper, I provide auxiliary stripper fingers 9; these fingers remove any paste which might gather on the friction bearings 10, on the paste delivery roll 6, inasmuch as these two rolls 6 and 7 are in frictional contact at said ends so that the roll 7 will be revolved when the roll 6 revolves.

At the top of the machine, I provide two pressure rolls 12, 12, which are provided with grooves 13, between the raised peripheral ridges or bands 14. At each end of these pressure rolls 12, I use friction bearing surfaces 15, which come in contact with the bearing surfaces 10 on the paste distributing roll 6 and thus they are revolved by the said paste roll. The ridges 14 pass in between the sets of teeth 11 as the roll 6 revolves. The spaces 13 are present so that the paste will not come onto the pressure rolls 12, so that they will always be free from paste.

In order to prevent any paste from accumulating on the paste delivery roll 6, between the rows of teeth or protuberances 11, I provide a stripper 16, which is provided with scraping teeth 17, which pass over the surface between the rows of teeth 11, keeping said parts free from paste, the teeth or protuberances themselves passing through slots 18 in said stripper 16, which afford ample room for the teeth to pass through with the necessary paste upon the upper edge.

At the top of the machine, I provide a bar 19, provided with a row of delivery fingers 20 for taking off the material to which paste has been supplied. These fingers are peculiarly shaped being pointed at their forward ends 21 and extending back so that they will rise above the bar 19 and form knife edges at the top. The pointed finger ends 21 extend over and onto the roll 6 between the rows of protuberances or teeth and between the top edges thereof, coming very close to the roll 6.

In order to feed the material to be operated upon, into the machine I provide a feed plate 22. The rolls and strippers and parts just described which extend across the machine, are all connected at each end to the frames or housings 23 as shown and are supported by said frames 23. The roll 6 has end bearings 24 which are journaled in frames 23, and at one end the bearing 24 is extended to form a shaft 25 and through this shaft the roll 6 is revolved by means of pulley 26 and this roll revolves the roll 7 and the pressure rolls 12. The roll 7 is journaled in frames 23 at 30. I use four tie bars 27, which extend between the frames 23 and are connected thereto, for sterngth and stability.

The strippers 8 and 9 can be moved toward or away from roll 7 to allow more or less paste to be fed by the said roll 7, through medium of the set screws 28.

The rolls run and turn in the direction indicated by the arrows.

In Fig. 4, I show a piece of material 50 passing through the machine. It can be seen in Fig. 4 partly on the feed board 22 and partly passing over the teeth or protuberances 11 and partly on the delivery fingers 20, the paste is being placed on the material as it is passing through over the roll 6 and its teeth and the pressure rolls 12 are holding it in contact with the teeth which deliver the paste onto the material.

It will be understood that the teeth or protuberances 11 may be of any shape and size and may be distributed over the face of the roller in any desired manner.

It will readily be observed that by my peculiar construction of rolls and strippers that no paste can be deposited anywhere except onto the material and at certain and definite points, thus the machine is always clean and sanitary and will not smear up the material or mar the same, when the two pieces are united.

While I have herein described one specific form and means for carrying my invention into effect, it will readily become apparent that the same is capable of some changes and modification without departing from the spirit and principle of my invention and I wish to be understood as claiming that such modifications and changes will still fall within the scope of my invention.

What I claim as new and my invention and desire to secure by Letters Patent, is:

1. In a pasting machine of the character described, a paste feeding roll, a stripper therefor, a paste distributing roll, a stripper therefor, pressure rolls, and delivery fingers for receiving the material off of the paste distributing roll.

2. In a pasting machine of the character described, a paste distributing roll, provided with a multiplicity of raised teeth thereon, a paste feeding roll, a stripper for cleaning the paste off of the paste distributing roll between the teeth thereof and means for delivering the material off of said distributing roll.

3. In a pasting machine of the character described, a paste distributing roll, provided with sets of teeth around its periphery, a stripper for removing the paste from between the sets of teeth as said roll is revolving, means for delivering paste to said distributing roll, means for pressing the material onto the teeth of said roll and means for delivering the material off of said distributing roll.

4. In a pasting machine of the character described, a paste distributing roll, provided with peripheral rows of teeth, means for removing the paste from between said rows of teeth while said roll is revolving, means for feeding paste to said roll and means for pressing the material down upon said rows of teeth.

5. In a pasting machine of the character described, a paste distributing roll, provided with teeth around its periphery, a stripper for removing the paste from between said teeth, means for feeding paste to said roll, a stripper for removing the paste from the ends of said roll, pressure rolls, and means for delivering the material off of paste distributing roll.

6. In a pasting machine of the character described, a paste distributing roll, provided with teeth around its periphery, means for removing the paste from between said teeth as the roll is revolving, means for feeding paste to said roll and a series of fingers provided with knife edges for delivering the material off of said roll.

7. In a pasting machine of the character described, a paste distributing roll, means for feeding paste to the same, stripper fingers for removing the paste from between said teeth, pressure rolls having raised peripheral ridges passing between said teeth, and a series of delivery fingers extending onto the roll between said teeth.

In testimony whereof, I affix my signature at Cincinnati, Ohio, this 14th day of March, 1919.

LOUIS J. VAN GUELPEN.